Sept. 19, 1950     J. O. BERGLUND ET AL     2,522,499
METHOD OF MANUFACTURING TWISTED
DRILLS AND OTHER TOOLS
Filed March 24, 1948
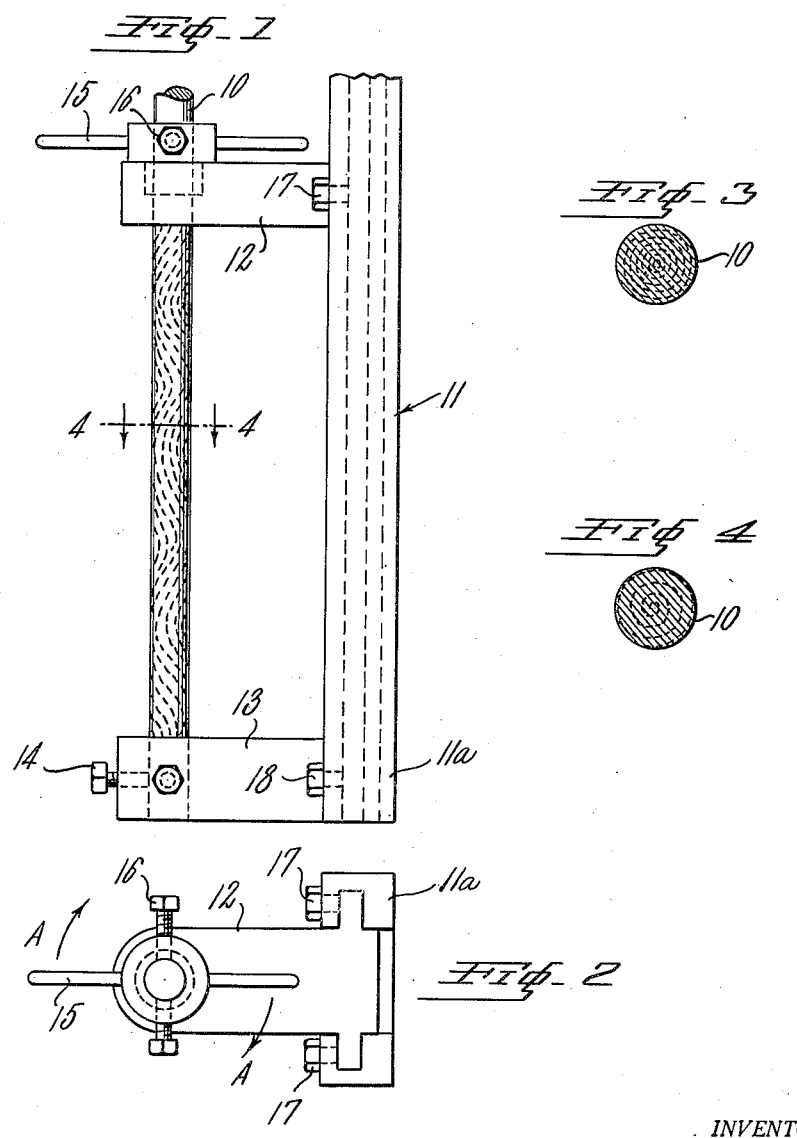
INVENTORS
JONAS OLOV BERGLUND
LARS GÖRAN WALLIN
BY
Leon M. Strauss Patented Sept. 19, 1950

2,522,499

UNITED STATES PATENT OFFICE 2,522,499

METHOD OF MANUFACTURING TWISTED DRILLS AND OTHER TOOLS

Jonas Olov Berglund and Lars-Göran Wallin, Gnesta, Sweden

Application March 24, 1948, Serial No. 16,876
In Sweden April 28, 1945

5 Claims. (Cl. 76—108)

When manufacturing drills and similar tools which are provided with helical flutes or grooves, generally steel bars are used in which the fibres of the material run parallel to the longitudinal axis of the bar which is due to the rolling or forging methods hitherto in use. If later on such a steel bar is to be provided with helical flutes including ground cutting edges, the fibres in the material of the steel bar will be cut and the marginal areas in the flutes will show obliquely cut fibres. Practical experience has proved that tools of this kind do not show a strength equal to that which could be obtained, if the fibres in the steel bar were grouped to follow the same helical line as the flutes to be provided in the bar.

The present invention has for its object to eliminate the aforesaid drawback and refers to an improvement in manufacturing twisted drills and other tools which are to be provided with helical flutes. It is another feature of the invention to subject a rolled, forged or drawn steel bar of circular cross-section which is to be provided with helical flutes and cutting edges, to treatment in such a manner that the original grain lines or fibres within the steel bar will be changed to assume a position in which they are grouped in helical lines corresponding to the twist of the flutes, whereupon the helical flutes are milled in such a manner that they run parallel to the direction of said fibres.

Although different manners of the method according to the invention are possible for obtaining best results, it is, preferred to subject the steel bar after the rolling or forging operation to a torsion step around its own longitudinal axis so that the direction of the fibres follows the desired helical form to be imparted to the flutes and cutting edges.

Other possible methods of treating the steel bars in order to attain the same result should be included in the scope of the invention which also shall comprise twisted drills and other tools manufactured of bars which have been treated according to the above described method.

In the drawing:

Fig. 1 shows the clamping of a steel rod within a device for carrying out the method according to the present invention;

Fig. 2 shows a top plan view of the embodiment of Fig. 1;

Fig. 3 shows a cross-section of the steel rod in normal position of its fibres; and Fig. 4 shows a cross-section of the steel rod in helically grouped position of its fibres.

Referring now to the attached drawing, Fig. 1 illustrates one of the possible ways according to which the method of the invention is performed. The circular shaped bar or rod 10 is placed within a clamping device 11 having upper and lower holders 12, 13. Rod 10 is clamped in fixed position in holder 13 by means of a suitable set screw 14. The opposite end of rod 10 is connected with handle bars 15 attached to said rod end by means of a bolt 16. The distance between holders 12, 13 may be adjusted by means of set screws 17, 18 which are adapted to bind slidable holders 12, 13 to frame 11a of the device.

It will now be apparent that to rod 10 after being heated to a predetermined temperature, may be imparted by means of movement of the handle bars 15 in the direction of arrows A—A a twist whereby the inner fibres of rod 10 change their parallel grouping, as indicated in dotted lines in Fig. 2 to a helical grouping as indicated in dotted lines in Fig. 4.

Having now described the invention, what is claimed as new and desired to be secured by Letters Patent is:

1. The method of manufacturing drills and other tools to be provided with helical flutes, comprising the step of subjecting a steel bar of circular cross-section to twisting action whereby the fibres in said steel bar are grouped to follow helical formation which corresponds approximately to that of the flutes, and then cutting helical flutes in said bar so that said flutes run substantially parallel to the direction of said grouped fibres.

2. The method of manufacturing drills and other tools to be provided with helical flutes, comprising the step of subjecting a steel bar to twisting action whereby the fibres in said steel bar are displaced from normal position in which said fibres run substantially parallel to the longitudinal axis of said bar to assume helical formation which substantially corresponds to that of the flutes, and cutting thereafter helical flutes in said bar whereby said flutes run substantially parallel to the direction of said displaced fibres.

3. The method according to claim 2, wherein said twisting action imparts a torsion effect to said bar around its longitudinal axis.

4. The method according to claim 2, wherein said bar is subjected to heat treatment during said twisting action.

5. The method according to claim 2, wherein said bar is subjected to said twisting action while said bar is substantially in a cold state.

J. OLOV BERGLUND.
LARS-GÖRAN WALLIN.

No references cited.